June 26, 1962  H. Z. GRAY  3,040,353
COMPOSITE CLEANING ARTICLE AND METHOD OF MANUFACTURING SAME
Filed Sept. 17, 1958  2 Sheets-Sheet 1

INVENTOR.
HARRY Z. GRAY
BY Ely, Fryed Hamilton
ATTORNEYS

June 26, 1962     H. Z. GRAY     3,040,353
COMPOSITE CLEANING ARTICLE AND METHOD OF MANUFACTURING SAME
Filed Sept. 17, 1958     2 Sheets-Sheet 2

*INVENTOR.*
HARRY Z. GRAY
BY *Ely, Frye & Hamilton*

ATTORNEYS

3,040,353
COMPOSITE CLEANING ARTICLE AND METHOD OF MANUFACTURING SAME
Harry Z. Gray, Lebanon, Ohio
Filed Sept. 17, 1958, Ser. No. 761,519
6 Claims. (Cl. 15—118)

The present invention relates to an improved composite cleaning article and to a novel method of manufacturing same, and the invention is a continuation-in-part of my copending application Serial No. 598,403, filed July 17, 1956, now Patent No. 2,942,285, issued June 28, 1960, which discloses and claims generically a cleaning article and a method of making same having a body of polyurethane foam with a mesh fabric of a synthetic fiber or resin, preferably nylon, secured to said foam.

The article of the invention is primarily intended for use in cleaning vehicle windshields and in household cleaning chores which require the presence of water, a soap or detergent, and an abrasive surface to obtain an effective cleaning action. Such chores include the scrubbing of floors, the cleaning of pots, pans, charcoal grills, etc. However, the cleaning device is also useful for washing walls, cleaning windows, wiping off tables, and other such chores requiring only a mild abrasive action.

In my said copending application the mesh fabric is secured to the foam by stitching adjacent the edges of the fabric, and this provides a satisfactory product. However, I have now discovered how to heat seal nylon mesh to the polyurethane foam, and thus provide a novel, more economical method of manufacturing the product, as well as providing an improved product having a longer useful life.

It is therefore an object of the invention to provide an article which is satisfactory for use in all cleaning and scrubbing chores which require the presence of water, a soap or detergent, and an abrasive surface.

Another object is to provide such an article in a form which will retain its structural integrity over long periods of use, and which is water-retentive, non-flammable and resistant to soaps, detergents, acids, alkalis, rot, mildew, oils, greases, and most common reagents.

A further object is to provide an improved composite cleaning article having a body of polyurethane foam and an abrasive layer of nylon mesh heat sealed adjacent its edges on at least one side of the foam body.

Still further, it is an object to provide a novel method of forming the said composite cleaning article.

These and other advantages of the invention will be apparent in view of the following detailed description of the invention when considered with the attached drawings.

Figure 1:
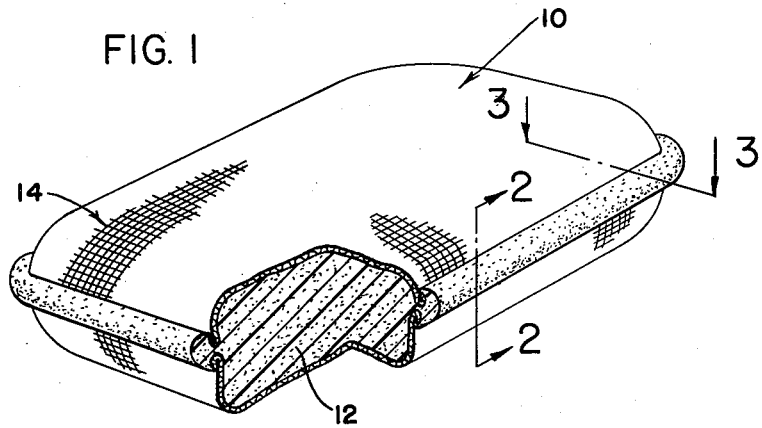
FIG. 1 is a perspective view, with one corner broken away, showing one form and structure of a cleaning article according to the invention.
Figure 3:
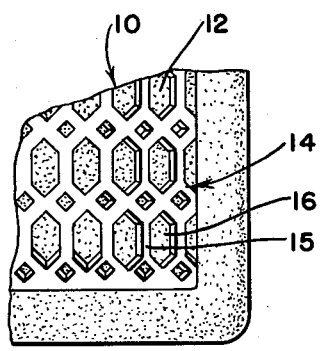
FIG. 3 is an enlarged fragmentary plan view taken substantially as indicated on line 3—3 of FIG. 1.
Figure 2:
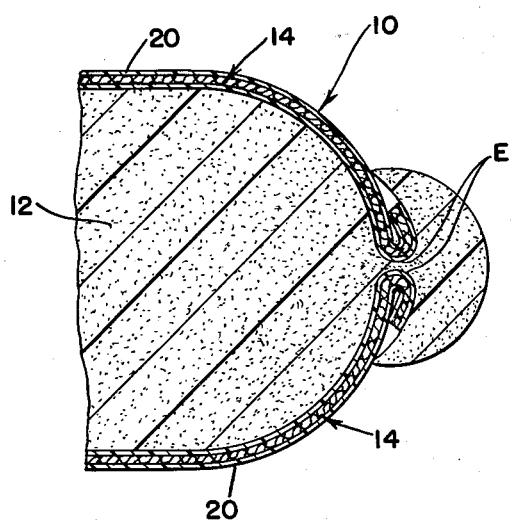
FIG. 2 is an enlarged fragmentary section taken through the edge of the article, substantially as indicated on line 2—2 of FIG. 1.

The improved article in the embodiment shown in FIGS. 1–3 is indicated in its entirety by the numeral 10, and is shown in a generally rectangular shape. It will be understood, however, that the invention is not to be limited to the specific shape shown, but that it may be embodied in square, round or other suitable symmetrical shapes.

The body 12 of the article is formed of the resilient type of polyurethane foam material generically described as any polymeric substance containing in chemical combination the reaction residue of an organic compound having a plurality of groups of the formula —NCX, wherein X is O or S, and having a sponge-like appearance or structure so full of cavities that it weighs less than thirty (30) pounds per cubic foot. Such a foam has an interconnecting cell structure which is water-retentive while retaining high strength. The foam material is readily cut into the desired body shape and is non-flammable and resistant to soaps, detergents, acids, alkalis, rot, mildew, oils, greases and most common solvents.

The coverings 14 are a nylon fiber mesh, heat sealed to the foam body 12 adjacent the edges E thereof. The nylon mesh, which has regularly spaced and alternating strands 15 and interstices 16 (see FIG. 3) is a desirable covering material because of nylon's high tensile strength, its high retention of strength when wet, and its resistance to soaps, detergents, weak acids, alkalis and common solvents. As disclosed in my copending application Serial No. 598,403, a nylon fiber mesh covering could be attached to a polyurethane foam body 12 by mechanical means such as stitching or sewing.

Heretofore, it has not been possible to heat seal a nylon fiber mesh to a body of polyurethane foam because the temperature at which nylon fiber begins to soften (400° F. and higher) is well above the maximum service temperature (300° F. or less) of polyurethane foam.

However, it has now been found that a nylon fiber mesh can be securely attached to a polyurethane foam body 12 by heat sealing techniques, if the nylon is coated with a suitable bond promoting material to which the foam will adhere under heat sealing temperatures and pressure, and thereafter remain permanently adhered thereto.

Figure 4:
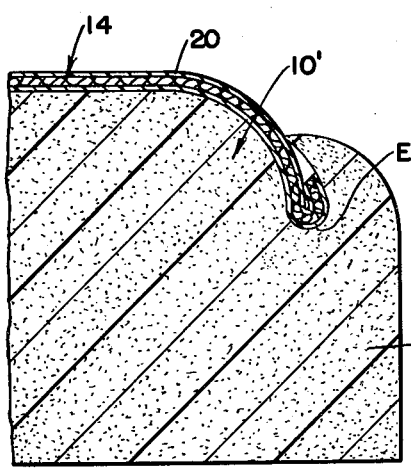
FIG. 4 is a view similar to FIG. 2, showing a modified form of the article with the mesh covering on only one side.

Referring to FIG. 2 and also to the modified embodiment of FIG. 4, the fiber mesh 14 is shown as having a coating 20 which is exaggerated in thickness for the purpose of illustration. By use of the coating 20, it is now possible to heat seal nylon mesh to a polyurethane foam body.

The coating 20 is formed by dipping the fiber mesh 14 in a bath containing a polyamide resin of the type of Zytel 61 or 63, either in solution or in the form of an aqueous-alcohol suspension. Zytel 61 or 63 is a nylon resin which is obtainable from E. I. du Pont de Nemours and Co.

The coating 20 provides a porous and abrasive surface which readily permits a bond to be formed with the polyurethane sponge 12 by the application of heat and pressure.

Figure 5:
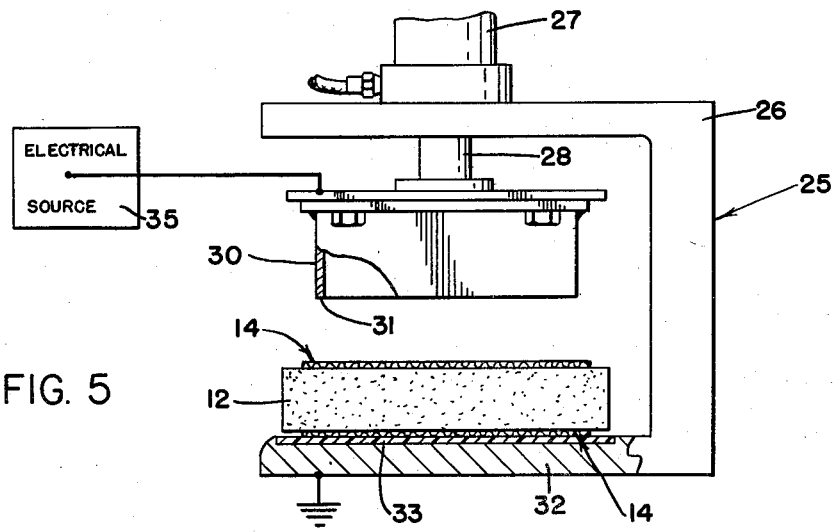
FIG. 5 is a view in elevation showing schematically apparatus for forming the article.
Figure 6:
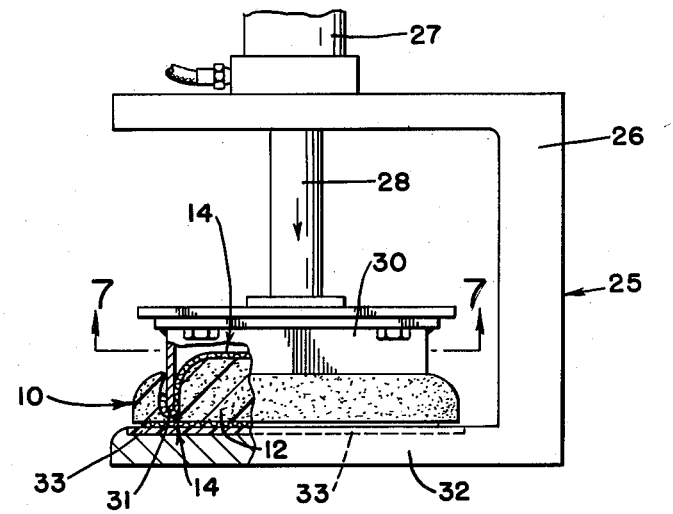
FIG. 6 is a view similar to FIG. 5, showing the article of FIGS. 1 to 3 being formed.
Figure 7:
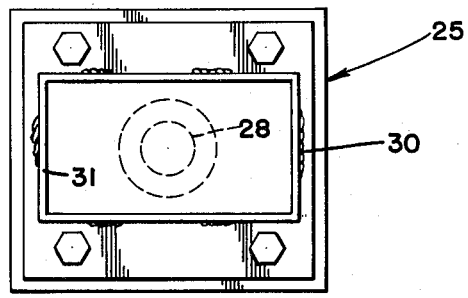
FIG. 7 is a view taken from the bottom line 7—7 of FIG. 6 without the article.

Referring to FIGS. 5–7, suitable heat sealing apparatus, indicated generally at 25, includes a structural or frame member 26 which may be C-shaped. The upper portion of member 26 supports a vertically directed pressure-fluid actuated cylinder 27 having an extensible piston rod 28. The lower end of the piston rod carries a hollow die 30 having a lower edge 31 substantially the same size as the area to be sealed. In other words, if the block 12 and mesh 14 are rectangular, the lower edge 31 of the die is also rectangular. If other shapes are desired, the die will be changed accordingly.

The die 30 is lowered by extension of rod 28 against a die block 32 which is a part of frame 26. Block 32 is preferably provided with a surface layer 33 of a heat resistant non-abrasive material such as "Teflon," so that the body 12 will not become adhered to the die block during the sealing operation.

In the form of the invention shown, the die 30 is heated by electrical energy supplied from a current source indicated at 35. The current source 35 may be a generator supplying a high-frequency current to a die 30 and having a 3.0 kilowatt output. This type of heating, commonly referred to as short wave or diathermy type equipment, has the advantage of requiring a short operating cycle (such as 4 seconds) for producing the article of the invention when the body 12 is a 1 inch by 3 inch by 5 inch block of polyurethane foam. However, the die 30 could be heated by other means such as resistance heating, in which case the source 35 would be a transformer.

The temperature to which the die 30 is heated by source 35 at the time of contact of the die edge 31 with the upper layer of mesh 14 and body 12 (see FIG. 6) may range from about 350° F. to about 450° F. The chosen temperature will heat the contacted area to a temperature above the softening point of the foam 12 but below the flow or yield point of the mesh 14. The coating 20 adheres to the mesh 14 and provides a porous and abrasive surface to form a bond with the foam 12. Thus, the coating permits a heat seal between mesh and foam to be obtained without destruction of either the mesh or foam.

The pressure transmitted through heated die 30 by cylinder 27 will be sufficient to substantially collapse the foam in the area of edge E to form one-eighth to one-third the original thickness of the foam body 12, in the manner shown in FIG. 6.

In actual practice, as represented in FIG. 6, a polyester foam block 1" x 3" x 5" was arranged in apparatus 25 with an upper and lower layer of nylon mesh 14 coated with an ethanol-water suspension of Zytel 63 nylon in contact with opposite sides of the foam. The die 30 was heated to about 425° F. and held against the composite structure of mesh-foam-mesh under a pressure sufficient to collapse the edge portions of the foam body to about one-quarter of its original thickness, for about 2 seconds. The heat from source 35 was then cut off and this pressure maintained an additional 2 seconds to stabilize the bond formed by the coating 20 between the mesh layers 14 and the foam 12. Upon release of the compression force, the finished article assumes the shape shown in FIGS. 1 and 2, the upper and lower layers of mesh 14 adhering at their edges to, and being separated by the collapsed area of the foam body. No separate die similar to die 30, in reversed position thereto, is necessary to produce the article of FIGS. 1 and 2.

To produce the modified form of article 10' shown in FIG. 4, with a layer of mesh 14 secured to one side only of the foam body 12, a lower layer of mesh 14 is omitted from the composite structure placed in apparatus 25 on top of die block 32. In the absence of a lower layer of mesh 14, the operation of apparatus 25 is the same as described in connection with the production of the article 10 of FIGS. 1 and 2.

What is claimed is:
1. A composite cleaning article comprising a body of polyurethane foam, and an abrasive layer of nylon mesh heat sealed only inwardly of its edges to at least one side of said body in compact relation thereto to provide a scrubbing area on said article.
2. A composite cleaning article comprising a body of polyurethane foam, an abrasive layer of nylon mesh, and a bond promoting coating on said mesh, said coating upon application of heat and pressure to said article providing a bond between said body and an area inwardly of the edges of said mesh.
3. A composite cleaning article comprising a body of polyurethane foam, an abrasive layer of nylon mesh, and a nylon resin coating on said mesh, said coating upon application of heat and pressure to said article providing a bond between said body and an area inwardly of the edges of said mesh.
4. A composite cleaning article comprising a substantially rectangular block of polyurethane foam interposed between substantially rectangular layers of nylon fiber mesh covering which provide scrubbing surfaces on the article, said block and layers being heat sealed together inwardly of the periphery thereof so as to form a bead of said foam around the circumference of said article.
5. The method of forming a composite cleaning article which comprises coating a layer of nylon fiber mesh with a thin layer of a bond promoting material in liquid suspension placing said coated layer of mesh in contact with a body of polyurethane foam, contacting said layer with a surface conforming with the area inwardly of the edges of said mesh and heated to above the softening temperature of the foam, and applying pressure to said heated surface sufficient to momentarily collapse said foam.
6. The method of forming a composite cleaning article which comprises coating a layer of nylon fiber mesh with a thin layer of nylon resin in liquid suspension, placing said coated layer of mesh in contact with a body of polyurethane foam, contacting said layer with a surface conforming with the area inwardly of the edges of said mesh and heated to above the softening temperature of the foam, and applying pressure to said heated surface sufficient to momentarily collapse said foam.

References Cited in the file of this patent
UNITED STATES PATENTS

| | | |
|---|---|---|
| 2,026,638 | Kingman | Jan. 7, 1936 |
| 2,382,169 | Pena | Aug. 14, 1945 |
| 2,698,272 | Clapp et al. | Dec. 28, 1954 |
| 2,804,728 | Polizter et al. | Sept. 3, 1957 |
| 2,885,703 | Elliott | May 12, 1959 |
| 2,904,814 | Scholl | Sept. 22, 1959 |
| 2,942,285 | Gray | June 28, 1960 |

FOREIGN PATENTS

| | | |
|---|---|---|
| 518,920 | Canada | Nov. 29, 1955 |
| 1,154,377 | France | Oct. 28, 1957 |

OTHER REFERENCES

"Modern Plastics," article, dated May 1945, pp. 125 and 126.

Article in "Modern Plastics," dated November 1954, vol. 32, #3, pp. 107 and 108.